United States Patent
Kobayashi et al.

(10) Patent No.: US 6,831,444 B2
(45) Date of Patent: Dec. 14, 2004

(54) EXTERNAL STORAGE DEVICE, AND REMAINING BATTERY AMOUNT NOTIFYING METHOD IN THE SAME

(75) Inventors: Koichi Kobayashi, Tachikawa (JP); Kazunari Tanzawa, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/235,914

(22) Filed: Sep. 6, 2002

(65) Prior Publication Data

US 2003/0141849 A1 Jul. 31, 2003

(30) Foreign Application Priority Data

Jan. 30, 2002 (JP) ........................................ 2002-022316

(51) Int. Cl.⁷ .................................................. H02J 7/00
(52) U.S. Cl. ..................................................... 320/136
(58) Field of Search ................................. 320/136, 132, 320/107, 112, 113, 114, 115; 340/636, 988, 995, 457.4; 701/213

(56) References Cited

U.S. PATENT DOCUMENTS 5,608,324 A * 3/1997 Yoshida ...................... 324/426
6,005,367 A * 12/1999 Rohde ......................... 320/106
6,173,350 B1 * 1/2001 Hudson et al. .............. 710/100
6,323,775 B1 * 11/2001 Hansson ...................... 340/636
6,385,721 B1 * 5/2002 Puckette ........................ 713/2

FOREIGN PATENT DOCUMENTS

JP        2000-32320        1/2000

* cited by examiner

*Primary Examiner*—Pia Tibbits
(74) *Attorney, Agent, or Firm*—Finnegan, Henderson, Farabow, Garrett, & Dunner, L.L.P.

(57) ABSTRACT

This invention relates to a portable external storage device including a battery which supplies power to a communication section which communicates with a plurality of information processing apparatuses, a detection unit which detects a remaining amount of the battery, a storage unit which stores setting information representing a notifying method for information about a remaining amount of the battery transmitted from the information processing apparatus serving as a host device, and a remaining amount of the battery at which a warning is generated, and a notifying unit which notifies the host device of information about the remaining amount of the battery detected by the detection unit on the basis of the setting information stored in the storage unit.

9 Claims, 15 Drawing Sheets

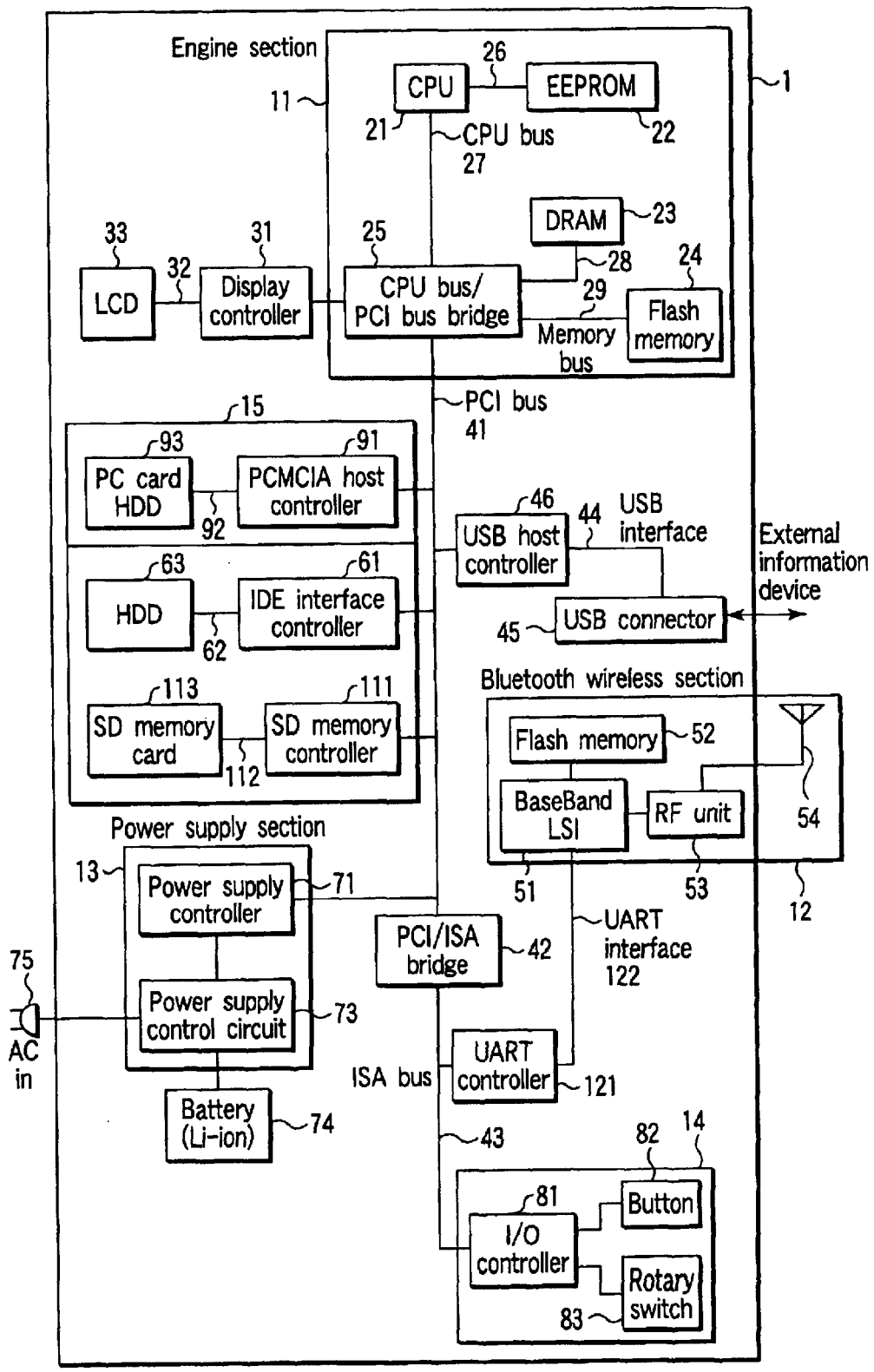
F I G. 2

EXTERNAL STORAGE DEVICE, AND REMAINING BATTERY AMOUNT NOTIFYING METHOD IN THE SAME

CROSS REFERENCE TO RELATED APPLICATIONS

This application is based upon and claims the benefit of priority from the prior Japanese Patent Application No. 2002-22316, filed Jan. 30, 2002, the entire contents of which are incorporated herein by reference.

BACKGROUND OF THE INVENTION

1. Field of the Invention

The present invention relates to an external storage device used as the external device of an information processing apparatus.

2. Description of the Related Art

Portable external storage devices having a wireless communication function have recently been developed. In the general use of the portable external storage device, the device is stored in a bag, shirt pocket, or the like. The external storage device accesses a host device such as a personal computer, PDA (Personal Digital Assistant), digital camera, or digital movie by Bluetooth radiowaves.

The remaining amount of battery in the portable external storage device, that is, the energy remaining in the battery, is confirmed on a display mounted on the portable external storage device.

As described above, the portable external storage device is often used in a bag, pocket, or the like. The user cannot quickly, easily confirm information such as the remaining amount of battery.

BRIEF SUMMARY OF THE INVENTION

The present invention has been made in consideration of the above situation, and has as its object to provide a device capable of letting the user know the remaining amount of battery and a warning that the battery is running short even while the device is stored in a bag, pocket, or the like.

To achieve the above object, according to the present invention, there is provided an external storage device comprising a battery which supplies power to a communication section which communicates with an information processing apparatus, detection means for detecting a remaining amount of the battery, and notifying means for notifying the information processing apparatus of information about the remaining amount of the battery detected by the detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the arrangement of the portable external storage device according to the embodiment of the present invention;

DETAILED DESCRIPTION OF THE INVENTION

A portable external storage device according to a preferred embodiment of the present invention will be described below with reference to the several views of the accompanying drawing.

Figure 1:
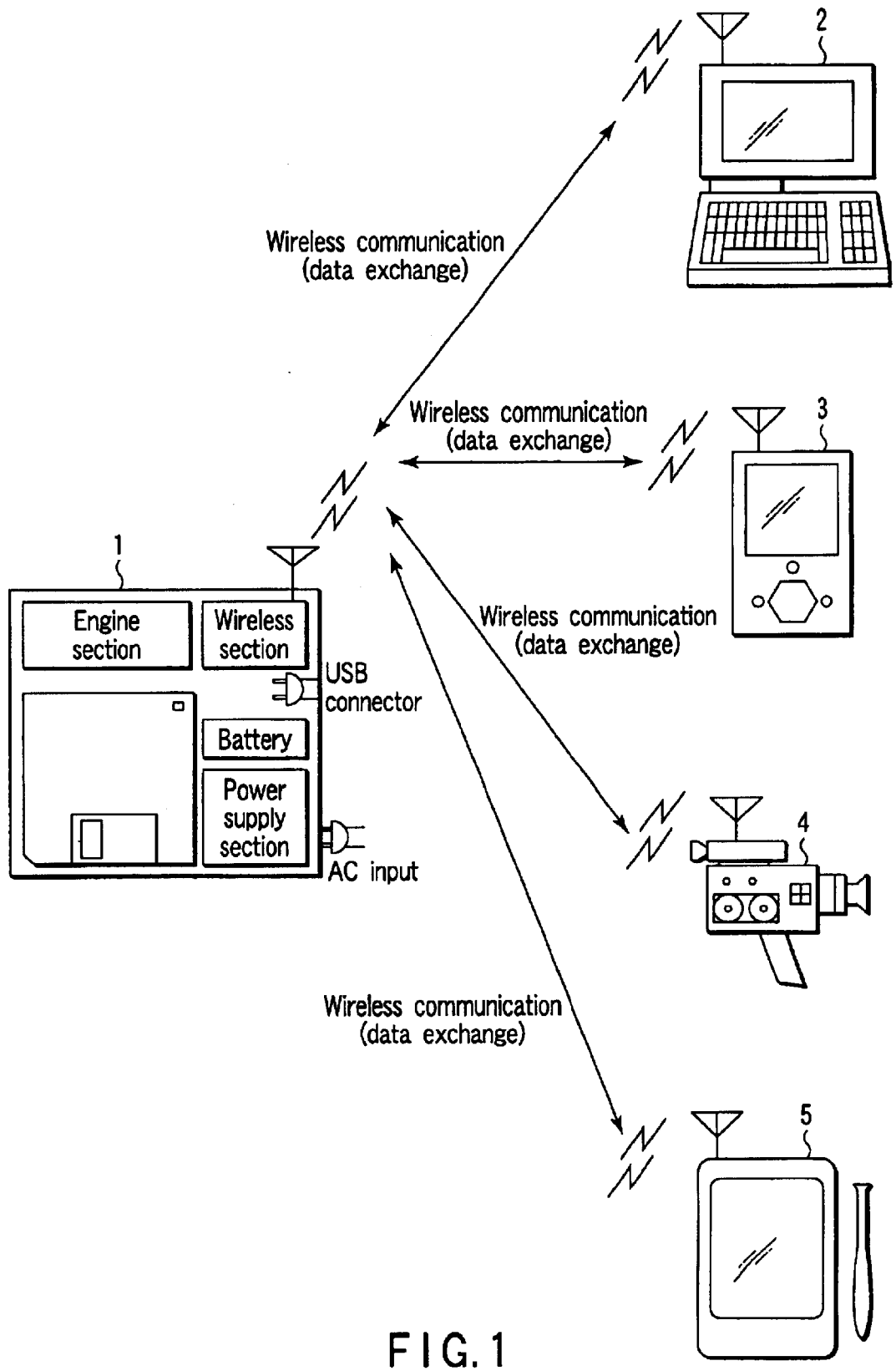
FIG. 1 is a view for explaining the use environment of a portable external storage device according to an embodiment of the present invention.

FIG. 1 is a view for explaining the use environment of the portable external storage device according to the embodiment of the present invention.

As shown in FIG. 1, communication partners of a portable external storage device 1 according to the embodiment are information devices such as a personal computer 2, portable game machine 3, digital video camera 4, and PDA (Personal Digital Assistant) 5. The portable external storage device 1 of the embodiment and the information devices 2 to 5 serving as communication partners incorporate Bluetooth modules, respectively, and exchange data via the Bluetooth modules.

For example, to exchange image data between the digital camera 4 and the personal computer 2, image data are first exchanged between the digital video camera 4 and the portable external storage device 1 by wireless communication using the Bluetooth modules, and stored in the internal recording medium of the portable storage device. At this time, the digital camera 4 and portable external storage device 1 can be wirelessly connected as far as they are positioned within a wireless communicable distance of about 100 m at maximum by the Bluetooth modules.

The portable external storage device is carried close to a predetermined distance (Bluetooth wireless communicable distance of about 100 m at maximum) from the personal computer 2 which transmits image data. Then, a Bluetooth link is automatically established, and image data is transferred from the portable storage device to the personal computer.

A portable external storage device according to the embodiment of the present invention will be described below. FIG. 2 is a block diagram showing the arrangement of the portable external storage device according to the embodiment of the present invention.

As shown in FIG. 2, a portable external storage device 1 according to this embodiment comprises an engine section 11, Bluetooth wireless section 12, power supply section 13, setting section 14, and storage section 15.

The engine section 11 controls the whole portable external storage device. A CPU 21 which controls the entire storage device is connected to an EEPROM 22 via a bus 26. The EEPROM 22 records various pieces of setting information of the portable external storage device.

The CPU 21 is connected to a CPU bus/PCI bus bridge 25 via a CPU bus 27. The CPU bus/PCI bus bridge 25 is connected to a DRAM 23 via a memory bus 28 and to a flash memory 24 via a memory bus 29.

The DRAM 23 is a work memory for the CPU 21, whereas the flash memory 24 stores a program executed by the CPU 21.

The CPU bus/PCI bus bridge 25 is connected to a display controller 31 via a bus 30, and the display controller 31 is connected to an LCD 33 via a bus 32. The display controller 31 controls the display of the LCD 33. The CPU bus/PCI bus bridge 25 functions as an interface bridge between the CPU bus 27 and a PCI bus 41.

The PCI bus 41 is connected to an ISA bus 43 via a PCI/ISA (Peripheral Component Interconnect/Industry Standard Architecture) bridge 42. The PCI bus 41 is connected to the Bluetooth wireless section 12 via a USB host controller 46 and to a USB interface 44. The USB interface 44 is connected to a USB connector 45 for connecting a peripheral device.

The Bluetooth wireless section 12 comprises a baseband LSI 51 which is connected to the USB host controller 46 and controls the Bluetooth wireless function, a flash memory 52 which stores a program executed by the baseband LSI 51, an antenna 54, and an RF unit 53 which controls RF signals between the baseband LSI 51 and the antenna 54.

The PCI bus 41 is connected to the storage section 15. The storage section 15 comprises an IDE interface controller 61 connected via the PCI bus 41, and an HDD 63 connected to the IDE interface controller 61 via an IDE interface 62. The PCI bus 41 is connected to a PCMCIA host controller 91 and to a PC card HDD 93 via the PCMCIA host controller 91. The PCI bus 41 is further connected to an SD memory controller 111 and to an SD memory card 113 via the SD memory controller 111.

The PCI bus 41 is connected to the power supply section 13. The power supply section 13 comprises a power supply controller 71 connected to the PCI bus 41, and a power supply control circuit 73 connected to the power supply controller 71. The power supply control circuit 73 is connected to a battery 74 and AC input 75. Power is supplied from the battery 74 when the portable external storage device is used in a mobile environment, and from the AC input 75 in a battery chargeable/AC drivable environment.

Powers from the battery 74 and AC input 75 are supplied to elements such as the engine section 11, wireless section 12, and storage section 15 necessary to operate the portable external storage device.

The ISA bus 43 is connected to the setting section 14. The setting section 14 comprises an I/O controller 81 connected to the ISA bus 43, and a button 82 and rotary switch 83 connected to the I/O controller 81. The button 82 and rotary switch 83 are used for security setting such as input of a Bluetooth PIN code, and activation of the device.

The portable external storage device uses the HDD 63 as a storage medium in the above description, but the storage medium is not limited to this.

The operation of the portable external storage device according to the embodiment of the present invention will be explained.

The portable external storage device according to the embodiment of the present invention causes a host device to let the user know information about the remaining amount of battery in the portable external storage device.

Figure 3:
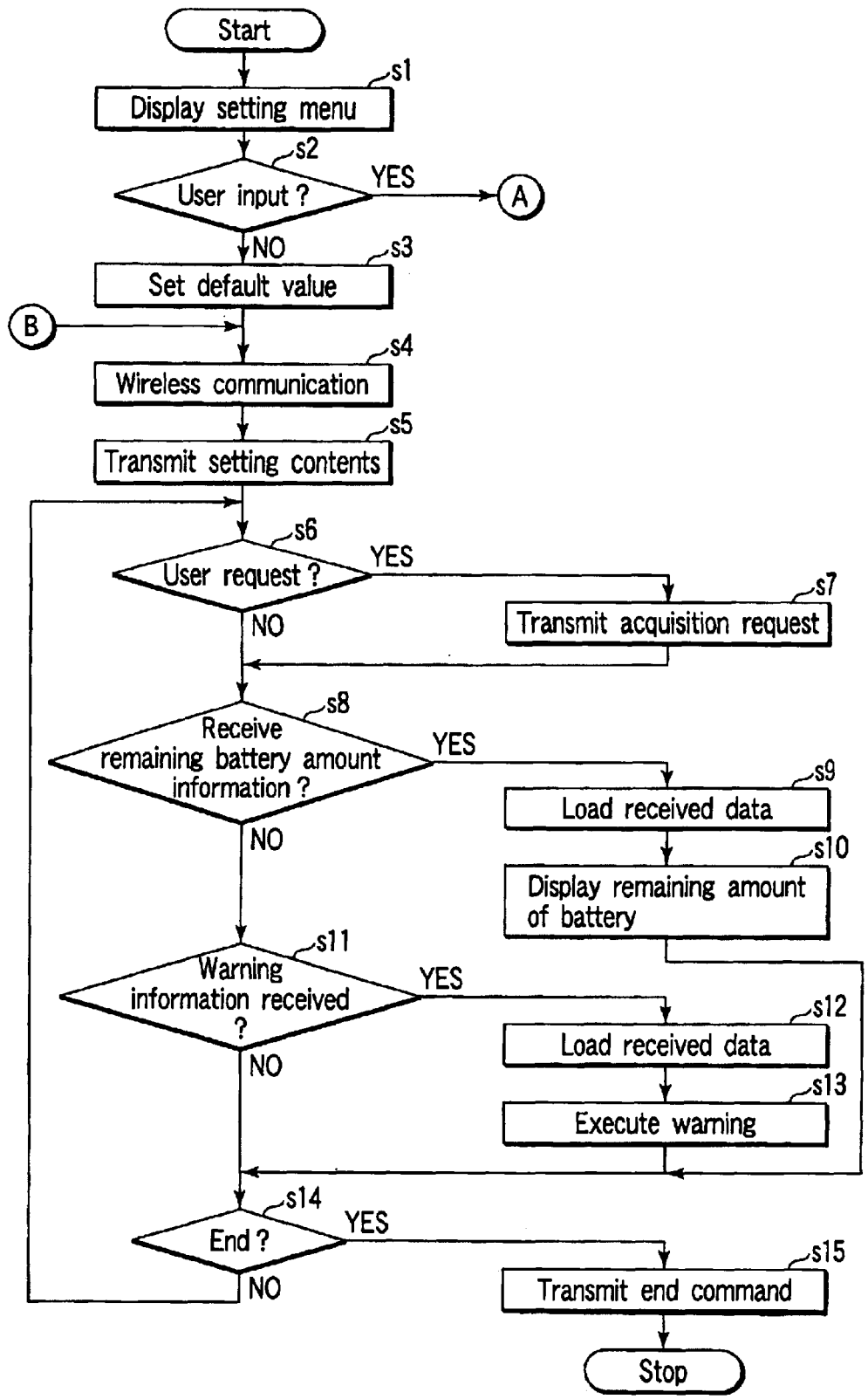
FIG. 3 is a flow chart for explaining the operation of a host device (e.g., PDA or PC) for the portable external storage device.
Figure 4:
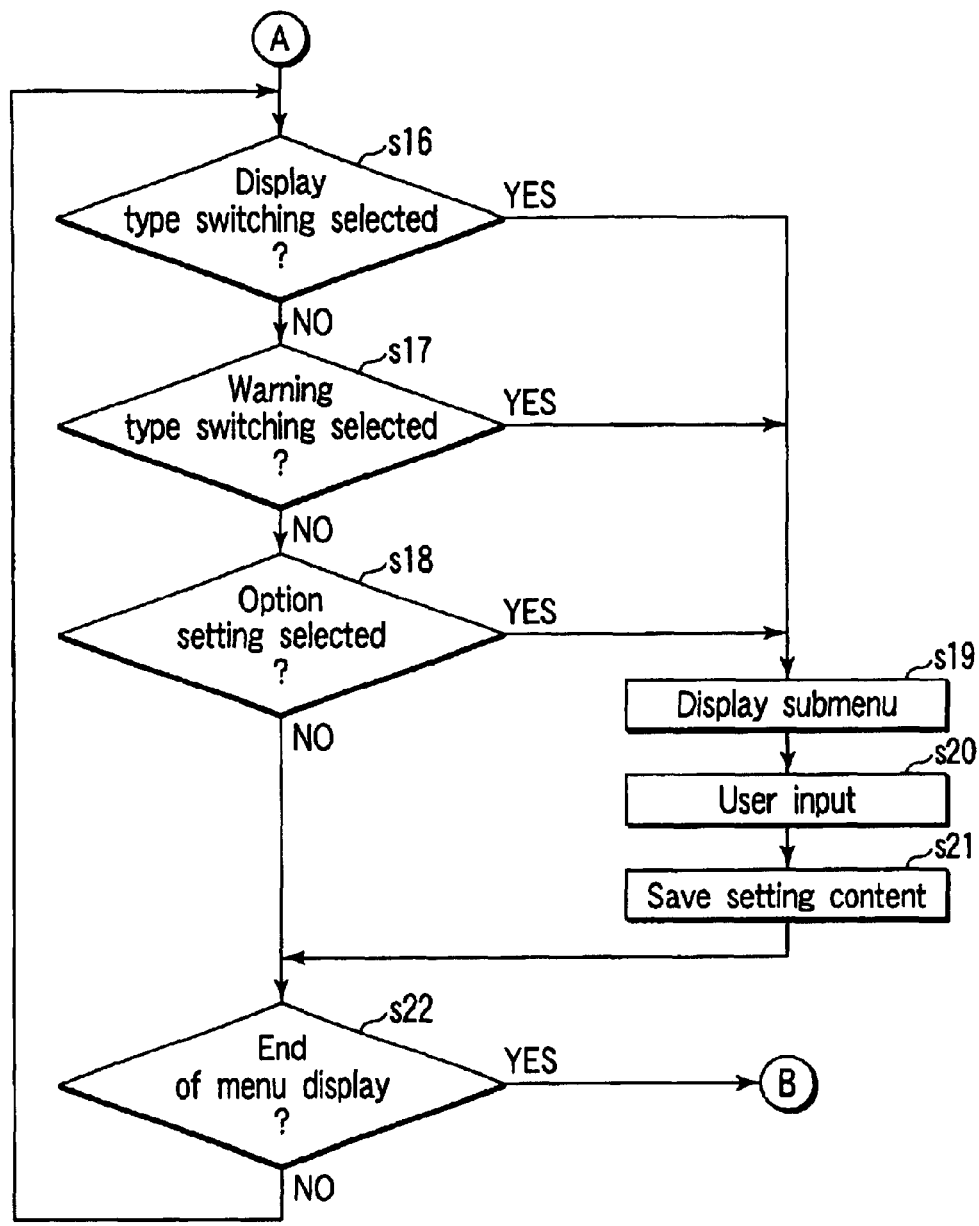
FIG. 4 is a flow chart for explaining the operation of the host device (e.g., PDA or PC) for the portable external storage device.

The operation of the host device (e.g., PDA or PC) of the portable external storage device will be described with reference to FIGS. 3 and 4.

Figure 11:
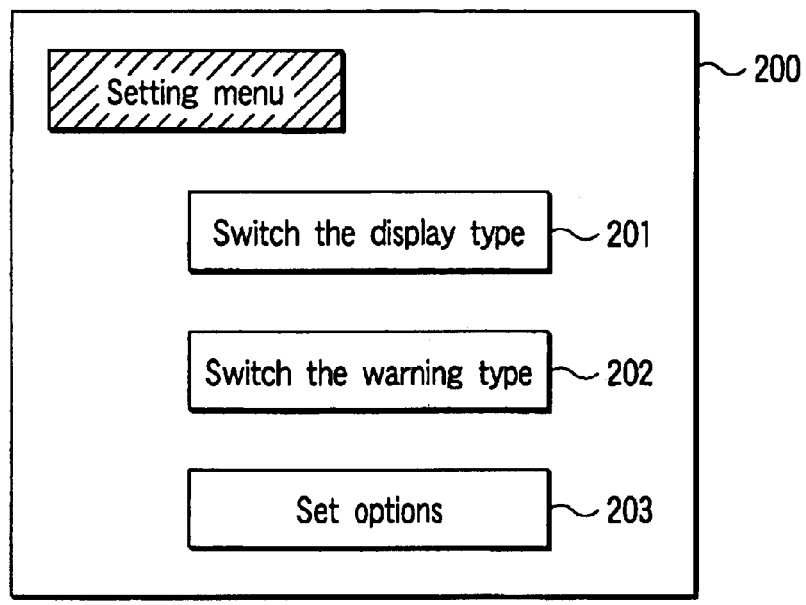
FIG. 11 is a view showing a setting menu window.

If a remaining battery amount notifying program starts in the host device, the host device displays a setting menu (S1). As shown in FIG. 11, the setting menu displays a display type switching button 201, warning type switching button 202, and option setting button 203 on a setting menu window 200.

The display type switching button 201 is a button for selecting an occasion when the remaining amount of battery is displayed.

The warning type switching button 202 is a button for selecting a warning method.

The option setting button 203 sets the threshold of the remaining amount of battery at which the user is warned of the remaining amount of battery, or an avoidance method in a warning.

The host device checks whether the user enters an input on the setting menu window 200 (S2). If YES in S2, the host device shifts to the process of S16.

Figure 12:
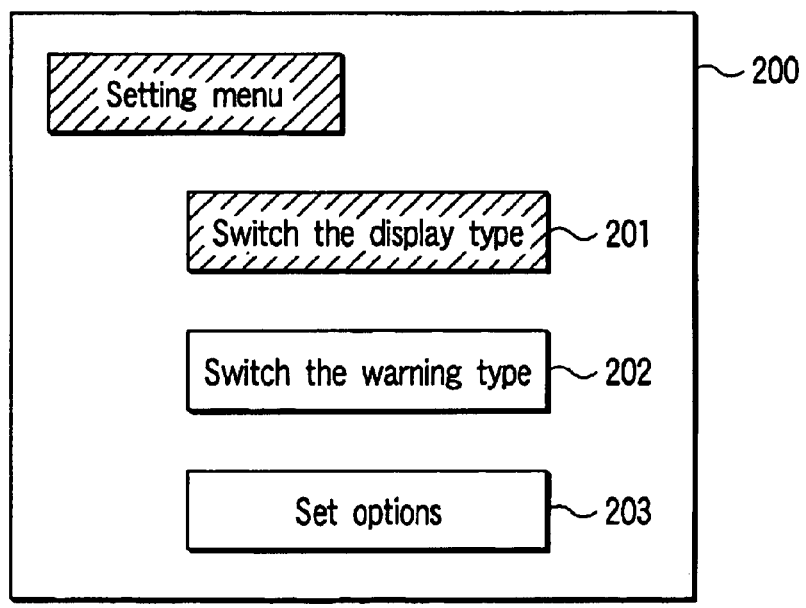
FIG. 12 is a view showing a case in which a display type switching button is selected on the setting menu window.

In S16, the host device checks whether the display type switching button 201 displayed on the setting menu window 200 is selected. If YES in S16 (FIG. 12), the host device displays a submenu 204 corresponding to the display type switching button 201 shown in FIG. 13 (S19).

The submenu 204 corresponding to the display type switching button 201 displays a remaining battery amount display "normally ON" button 205, remaining battery amount display "user designation" button 206, and remaining battery amount display "warning" button 207.

The remaining battery amount display "normally ON" button 205 is a button for selecting a remaining battery amount display "normally ON" mode in which information about the remaining amount of battery is always transmitted to the host device.

The remaining battery amount display "user designation" button 206 is a button for selecting a remaining battery amount display "user designation" mode in which information about the remaining amount of battery is transmitted to the host device when a user designates remaining battery amount display.

The remaining battery amount display "warning" button 207 is a button for selecting a remaining battery amount display "warning" mode in which information about the remaining amount of battery is transmitted to the host device when warning conditions set by the user are satisfied.

Figure 13:
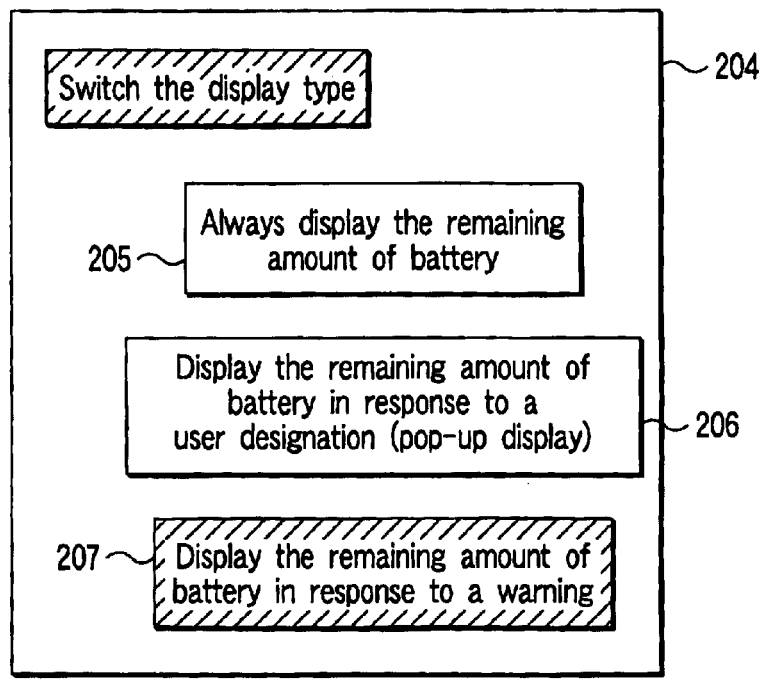
FIG. 13 is a view showing a submenu corresponding to the display type switching button.

Of the modes (remaining battery amount display "normally ON" mode, remaining battery amount display "user designation" mode, and remaining battery amount display "warning" mode) selected on the submenu corresponding to the display type switching button shown in FIG. 13, a mode input by the user (S20) is saved as setting information (S21).

Figure 14:
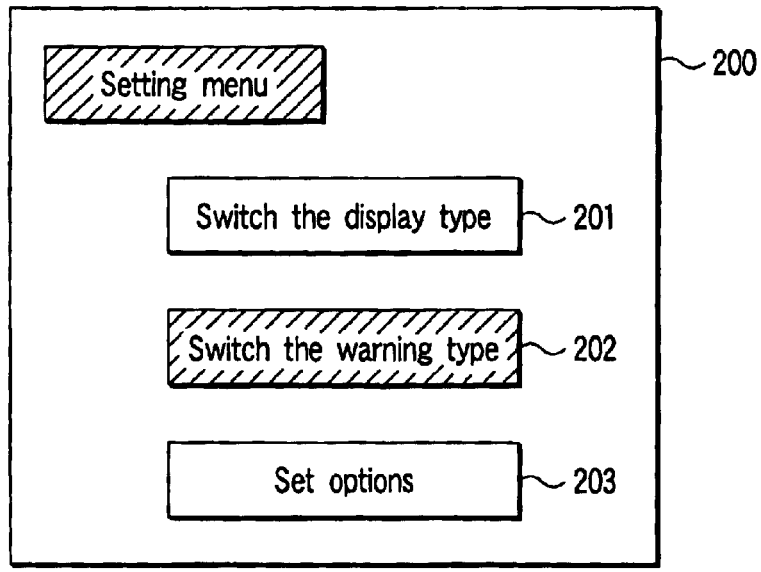
FIG. 14 is a view showing a case in which a warning type switching button is selected on the setting menu window.

If NO in S16, the host device checks whether the warning type switching button 202 is selected (S17). If YES in S17 (FIG. 14), the host device displays a submenu 208 corresponding to the warning type switching button 202 shown in FIG. 15 (S19).

The submenu 208 corresponding to the warning type switching button 202 displays an alarm ringing button 209, voice warning button 210, and warning character display button 211.

The alarm ringing button 209 is a button for selecting a mode in which a warning is generated by ringing an alarm.

The voice warning button 210 is a button for selecting a mode in which a warning is generated by voice.

The warning character display button 211 is a button for selecting a mode in which a warning is generated by characters.

Figure 15:
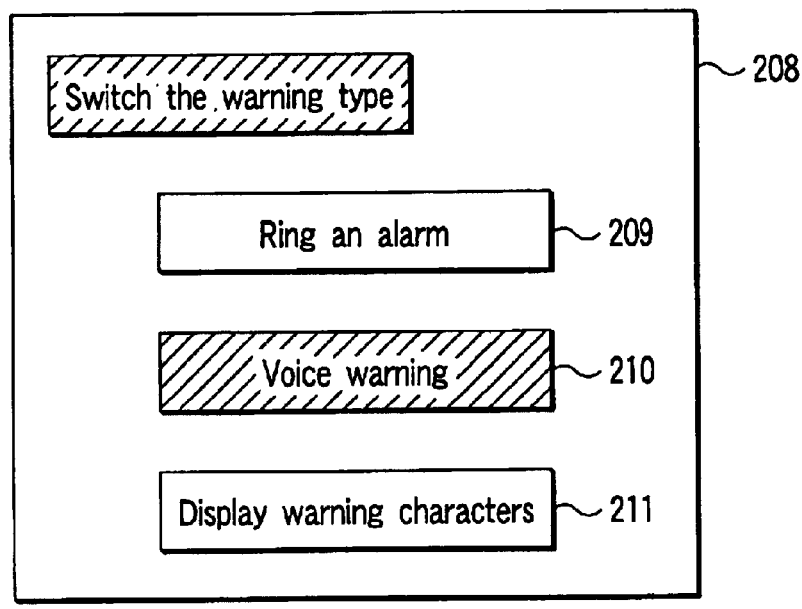
FIG. 15 is a view showing a submenu corresponding to the warning type switching button.

Of the modes (remaining battery amount display "normally ON" mode, remaining battery amount display "user designation" mode, and remaining battery amount display "warning" mode) selected on the submenu corresponding to the warning type switching button shown in FIG. 15, a mode input by the user (S20) is saved as setting information (S21).

Figure 16:
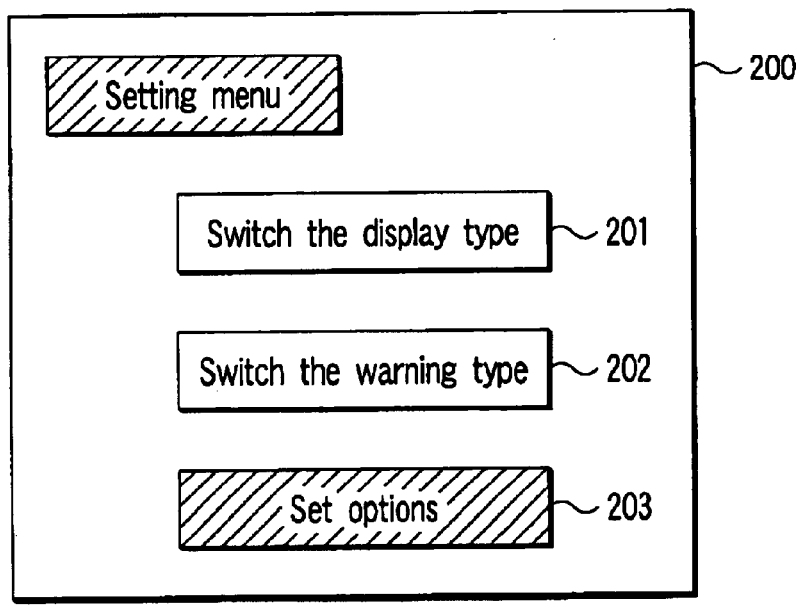
FIG. 16 is a view showing a case in which an option setting button is selected on the setting menu window.

If NO in S17, the host device checks whether the option setting button 203 is selected (S18). If YES in S18 (FIG. 16), the host device displays a submenu 212 corresponding to the option setting button 203 shown in FIG. 17 (S19).

Figure 17:
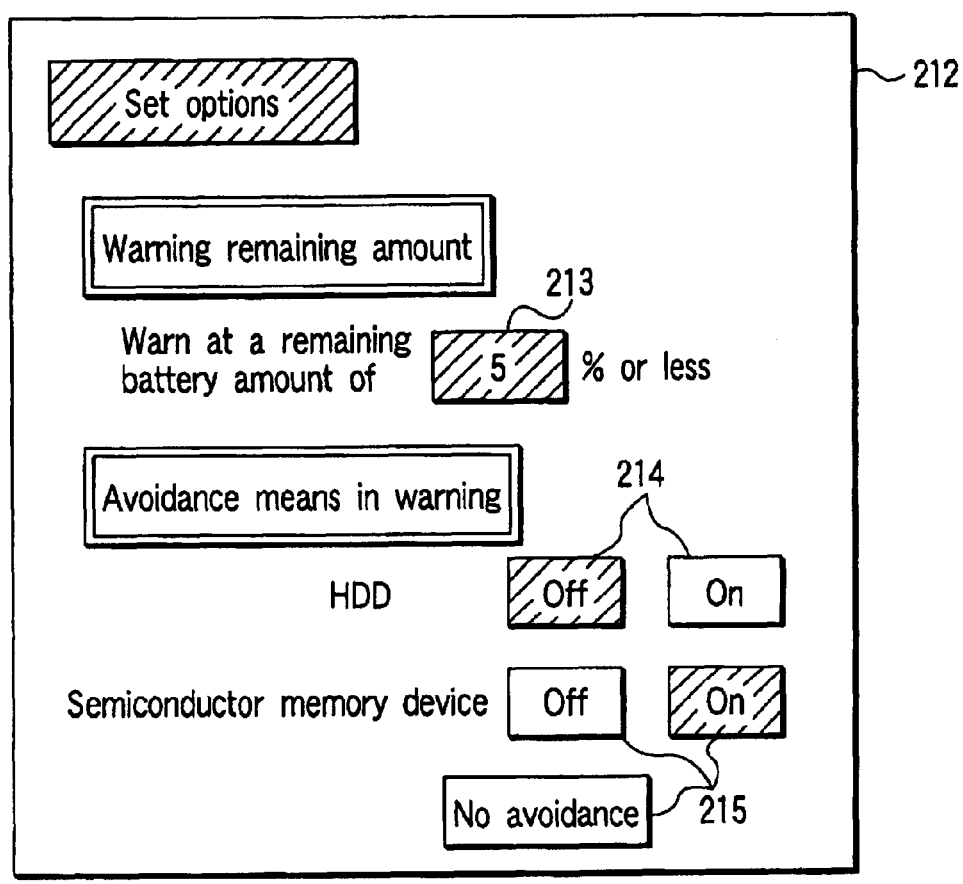
FIG. 17 is a view showing a submenu corresponding to the option setting button.

The submenu 212 corresponding to the option setting button 203 displays an item 213 for setting a remaining amount of battery at which a warning is generated, an item 214 for setting the avoidance means for an HDD in a warning, and an item 215 for setting the avoidance means for a semiconductor memory device (e.g., SD memory) in a warning. In FIG. 17, a warning is generated when the remaining amount of battery decreases to 5% or less. In the warning, the HDD is turned off, and the semiconductor memory device is turned on.

An item input by the user on the submenu 212 corresponding to the option setting button 203 shown in FIG. 17 is saved as setting information (S21).

After setting information is saved in S21, or if NO in S18, the host device checks whether the display of the setting menu ends (S22).

If NO in S22, the host device returns to the process of S16; if YES, to the process of S4.

If NO in S2, the host device determines that a default value is set (S3), and shifts to the process of S4. In S4, the host device establishes wireless communication with the portable external storage device according to the embodiment of the present invention, and transmits the setting information (S5).

The host device checks whether the user generates a remaining battery amount request (S6). If YES in S6, the host device transmits a remaining battery amount acquisition request to the portable external storage device (S7).

If NO in S6, or after the host device transmits the remaining battery amount acquisition request in S7, the host device checks whether to receive remaining battery amount information from the portable external storage device (S8).

If YES in S8, the host device loads the received data (S9), and displays the remaining amount of battery (S10).

The host device checks whether to receive battery warning information from the portable external storage device (S11). If YES in S11, the host device loads the warning information (S12), and executes a warning based on the setting information set by the user (S13).

For example, when the voice warning button 210 is selected on the submenu corresponding to the warning type switching button shown in FIG. 15, a warning is generated by voice. When the warning character display button 211 is selected, a warning message concerning the battery is displayed on the screen of the information processing apparatus.

Figure 18:
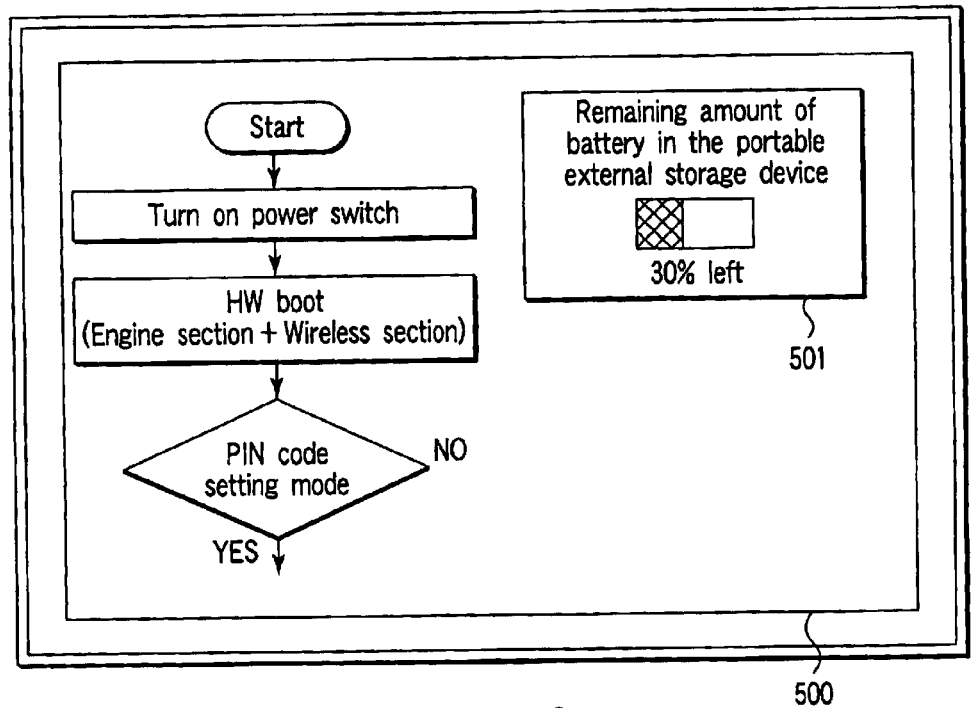
FIG. 18 is a view showing an example in which the remaining amount of battery in the portable external storage device is displayed as a pop-up window on the display of the host device.
Figure 19:
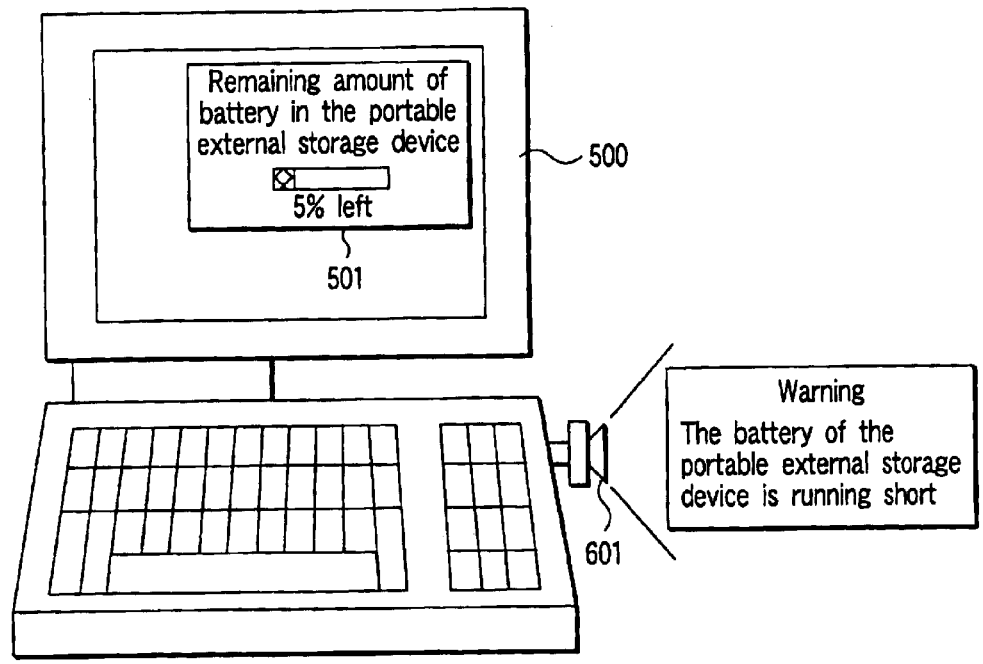
FIG. 19 is a view showing a state in which the loudspeaker of the host device outputs a warning by voice.

FIG. 18 shows an example in which the remaining amount of battery in the portable external storage device is displayed as a pop-up window 501 on a display 500 of the host device. FIG. 19 is a view showing a state in which a loudspeaker 601 of the host device outputs a voice warning.

Then, the host device checks whether the program ends (S14). If YES in S14, the host device transmits an end command to the portable external storage device (S15), and stops the program. If NO in S14, the host device returns to the process of S6.

Figure 5:
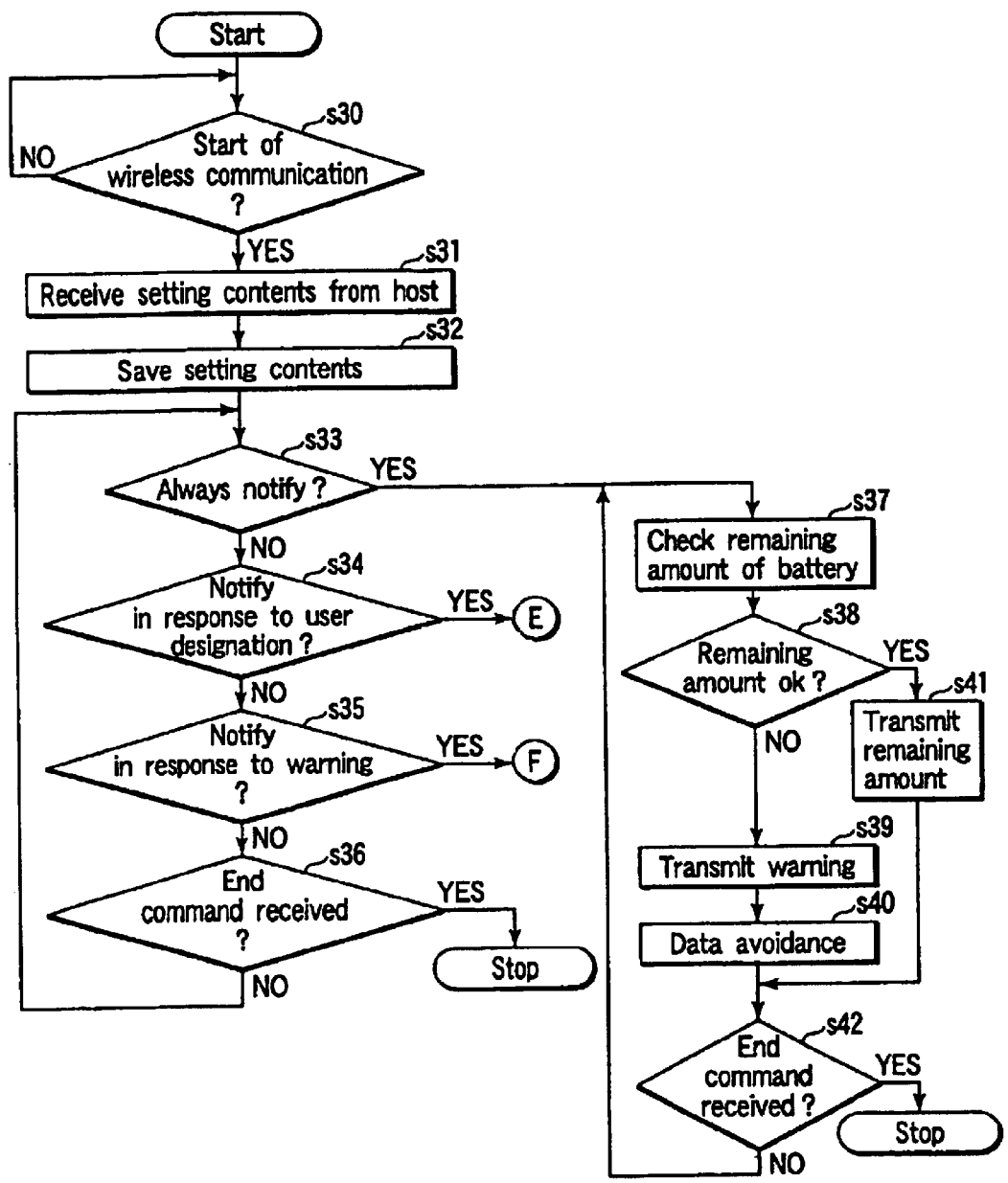
FIG. 5 is a flow chart for explaining the operation of the portable external storage device.
Figure 6:
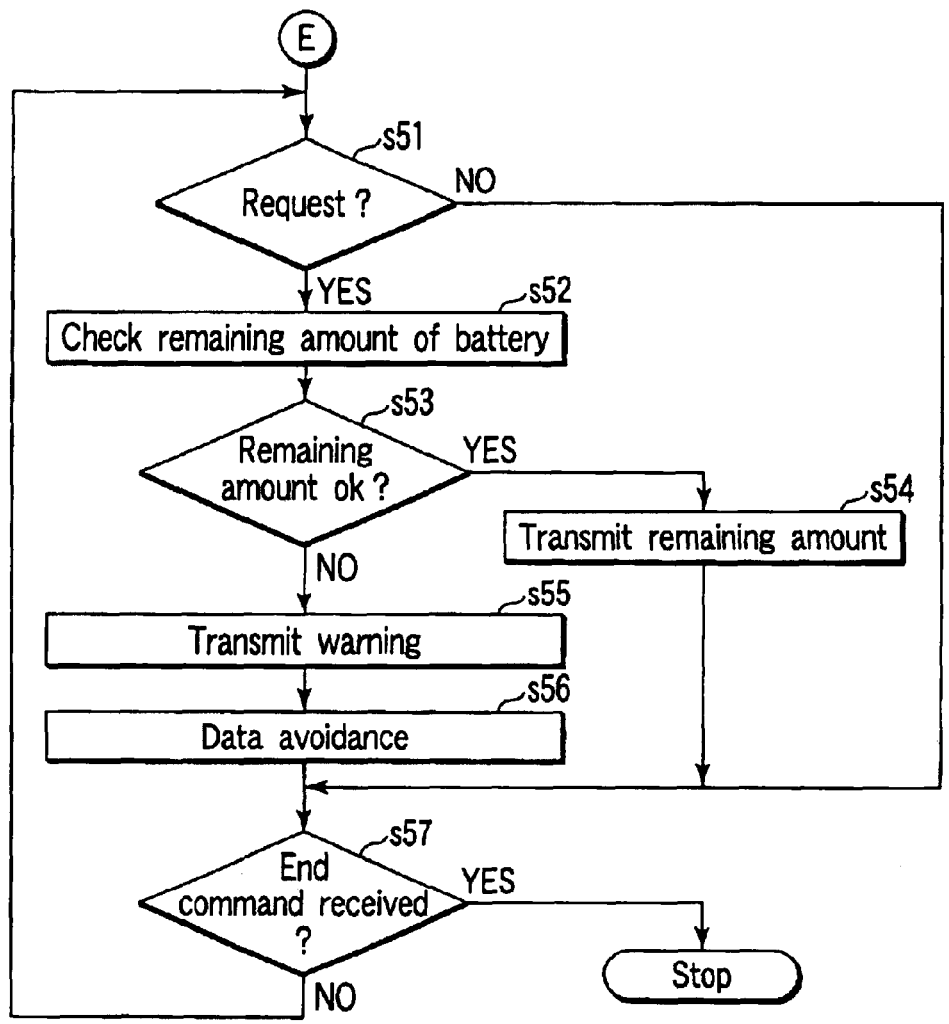
FIG. 6 is a flow chart for explaining the operation of the portable external storage device.
Figure 7:
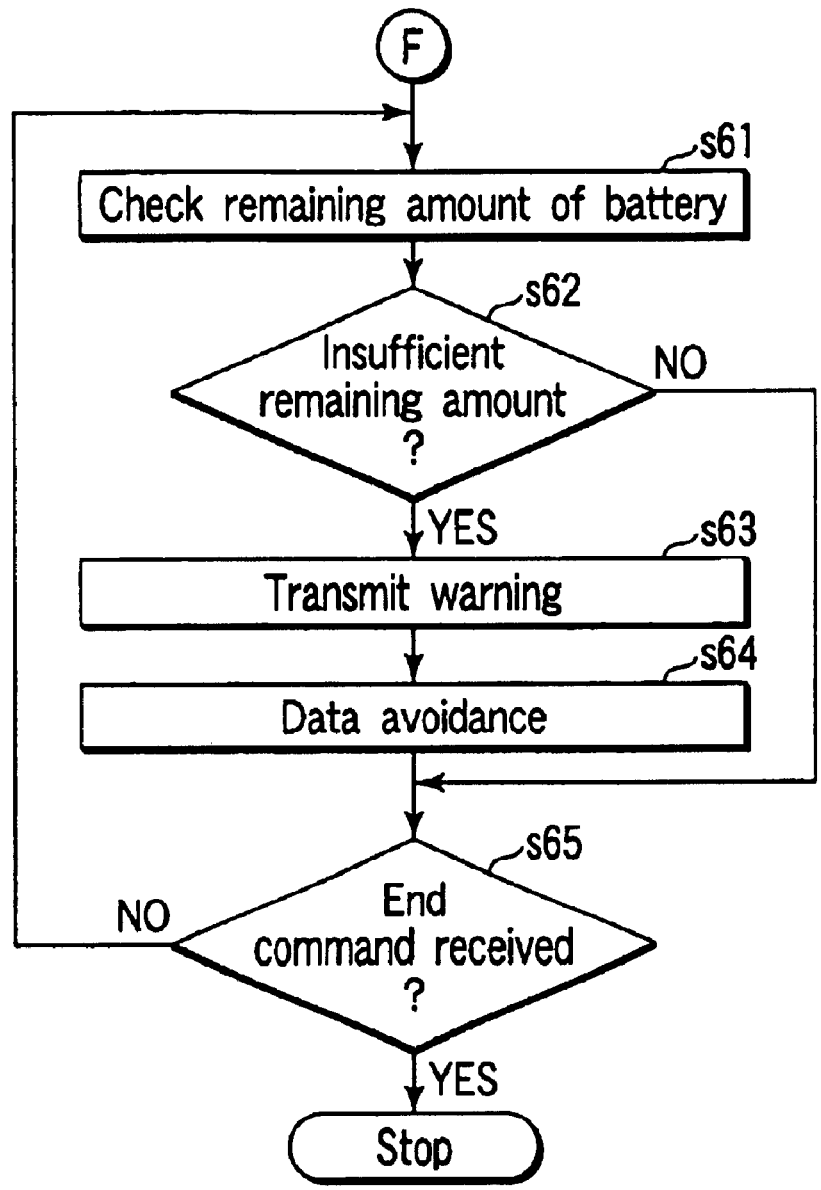
FIG. 7 is a flow chart for explaining the operation of the portable external storage device.

The operation of the portable external storage device will be explained with reference to FIGS. 5 to 7.

After the program starts, the portable external storage device checks whether wireless communication starts (S30). If YES in S30, the portable external storage device receives setting information from the host (S31), and saves the received setting information (S32).

The portable external storage device checks whether the remaining battery amount display "normally ON" ("always" notifying) mode has been selected on the submenu corresponding to the display type switching button (S33).

If YES in S33, the portable external storage device checks the remaining amount of battery (S37), and determines whether the checked remaining amount of battery is equal to or smaller than a warning remaining amount of battery represented by the saved setting information (S38).

If YES in S38, i.e., the battery has a sufficient remaining amount, the portable external storage device transmits the checked remaining amount of battery to the host device (S41).

If NO in S38, i.e., the battery is running short, the portable external storage device transmits warning information to the host device (S39). The portable external storage device saves its stored data in an avoidance destination of data, that is, the portable external storage device saves its data in an alternate storage location in order to avoid data loss when the warning is generated, represented by the setting information (S40). When the setting information represents no avoidance in a warning, no data avoidance is performed.

The portable external storage device checks whether it has received an end command from the host device (S42). If YES in S42, the portable external storage device stops the program; if NO, returns to the process of S37.

If NO in S33, the portable external storage device checks whether the mode in which the remaining amount of battery is displayed in response to a user designation is selected on the submenu corresponding to the display type switching button (S34).

If YES in S34, the portable external storage device checks whether it has received a remaining battery amount request from the host device (S51).

If YES in S51, the portable external storage device checks the remaining battery amount (S52), and determines whether the checked remaining amount of battery is equal to or smaller than a warning remaining amount of battery represented by the saved setting information (S53).

If YES in S53, i.e., the battery has a sufficient remaining amount, the portable external storage device transmits the checked remaining amount of battery to the host device (S54).

If NO in S53, i.e., the battery is running short, the portable external storage device transmits warning information to the host device (S55). The portable external storage device saves its stored data in an avoidance destination of data represented by the setting information (S56). When the setting information represents no avoidance in a warning, no data avoidance is performed.

Then, the portable external storage device checks whether it has received an end command from the host device (S57). If YES in S57, the portable external storage device stops the program; if NO, returns to the process of S51.

If NO in S34, the portable external storage device checks whether the mode in which warning information is transmitted in response to a warning is selected on the submenu corresponding to the display type switching button (S35).

If YES in S35, the portable external storage device checks the remaining amount of battery (S61), and determines whether the checked remaining amount of battery is equal to or smaller than a warning remaining amount of battery represented by the saved setting information (S62).

If NO in S62, i.e., the battery is running short, the portable external storage device transmits warning information to the host device (S63). The portable external storage device saves its stored data in an avoidance destination of data represented by the setting information (S64). When the setting information represents no avoidance in a warning, no data avoidance is performed.

The portable external storage device checks whether it has received an end command from the host device (S65). If YES in S65, the portable external storage device stops the program; if NO, returns to the process of S61.

Figure 8:
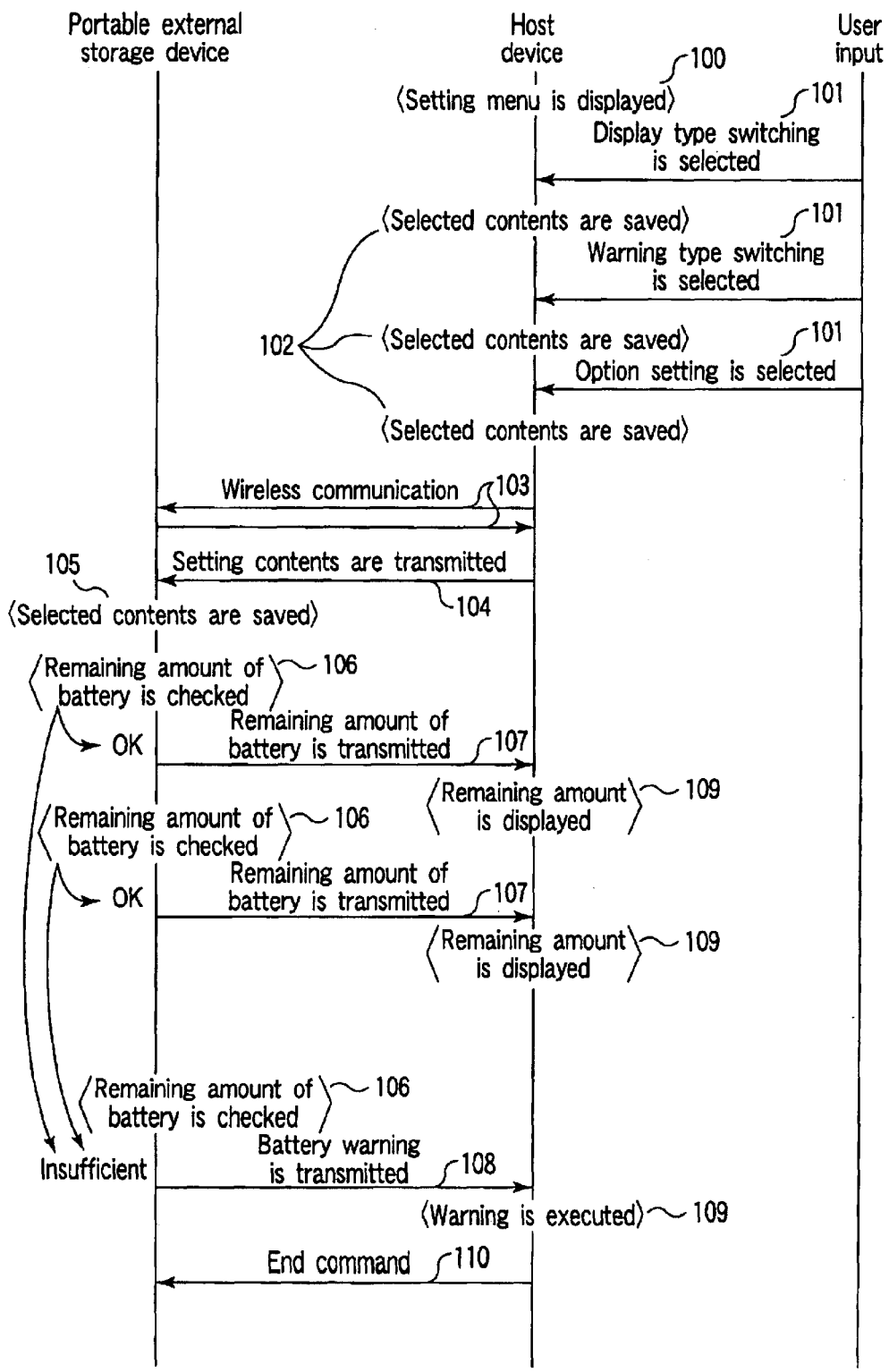
FIG. 8 is a view showing a time sequence between the portable external storage device and the host device.
Figure 9:
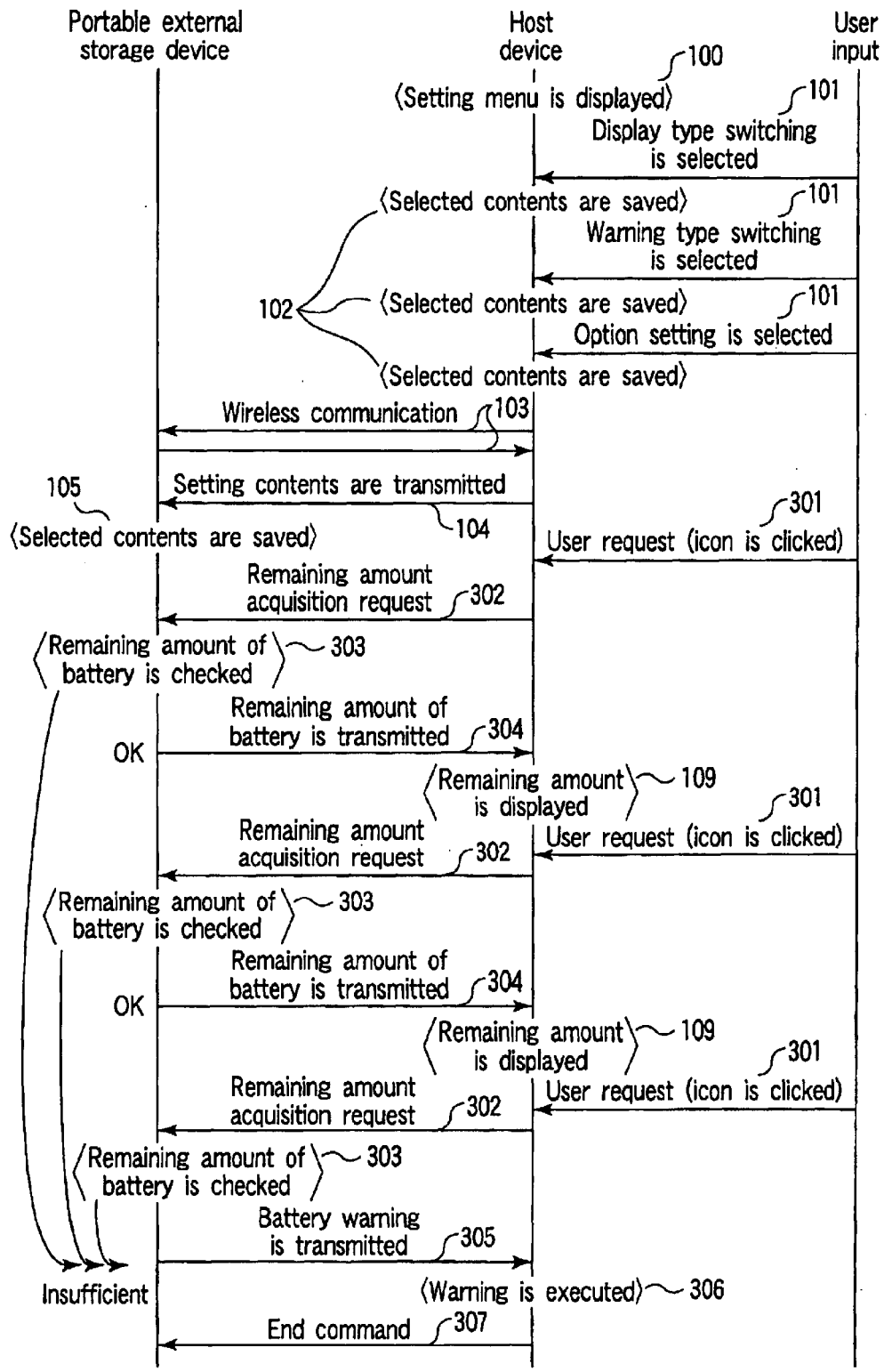
FIG. 9 is a view showing another time sequence between the portable external storage device and the host device.
Figure 10:
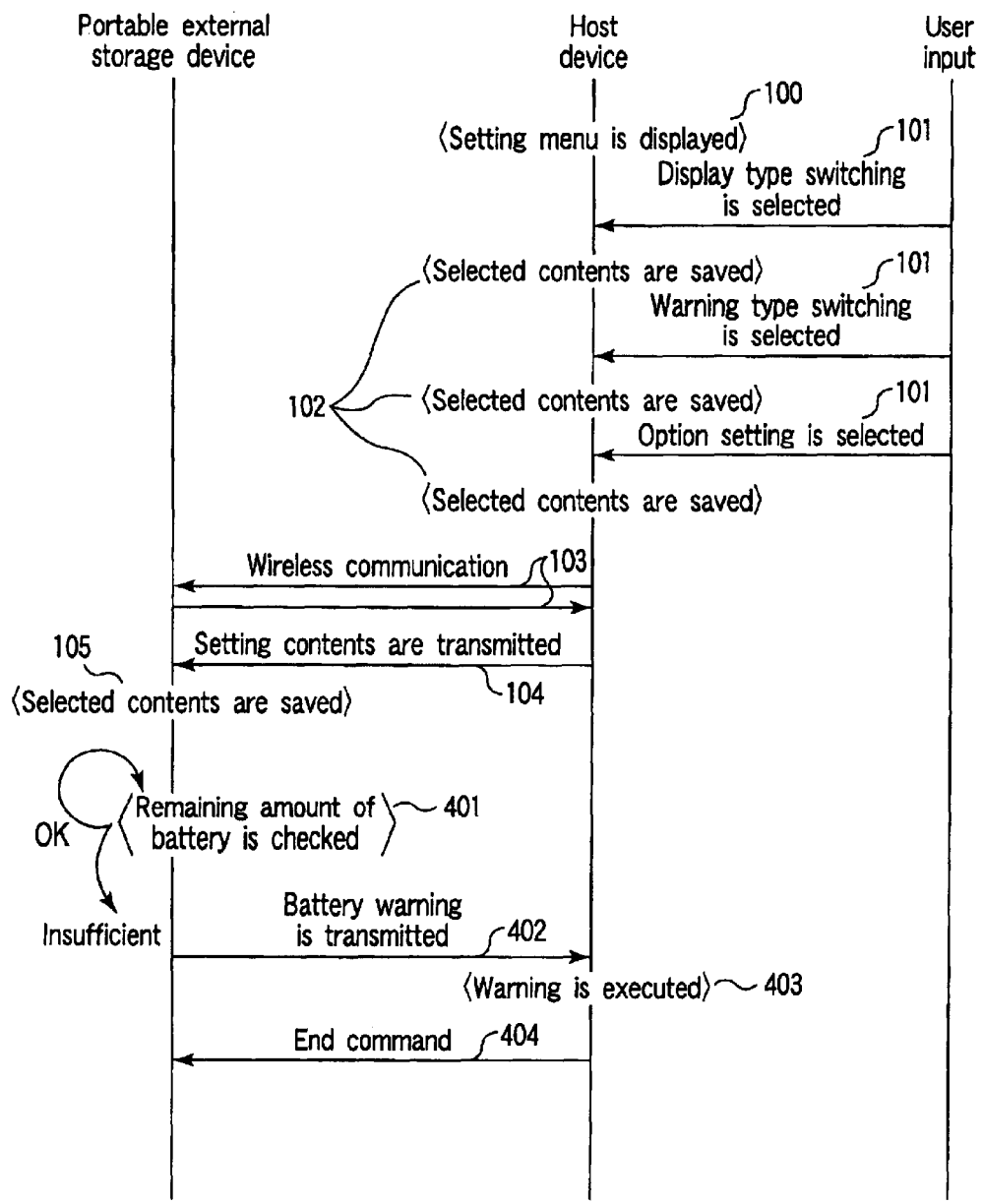
FIG. 10 is a view showing still another time sequence between the portable external storage device and the host device.

FIGS. 8 to 10 are views showing time sequences between the portable external storage device and the host device in the respective modes. FIGS. 8 to 10 are views for supplementally explaining the flow charts shown in FIGS. 3 to 7.

FIG. 8 is a view showing a sequence when remaining battery amount display is normally ON.

The host device displays a setting menu (100), and the user inputs settings on the displayed setting menu (101). The host device saves the pieces of input setting information (102).

After that, wireless communication (in this case, Bluetooth communication connection) is executed between the host device and the portable external storage device (103), and the host device transmits the setting information to the portable external storage device (104).

The portable external storage device saves the setting information transmitted from the host device (105). The portable external storage device checks the remaining amount of battery, and determines whether the checked remaining amount of battery is equal to or smaller than a remaining amount of battery represented by the setting information at which a warning is generated (106).

If the checked remaining amount of battery is larger than the remaining amount of battery represented by the setting information at which a warning is generated, i.e., the battery has a sufficient remaining amount, the portable external storage device transmits remaining battery amount information (107).

If the checked remaining amount of battery is equal to or smaller than the remaining amount of battery represented by the setting information at which a warning is generated, i.e., the battery is running short, the portable external storage device transmits battery warning information to the host device (108).

Upon reception of the remaining battery amount information or warning information, the host device performs processing such as display of a warning on the display or generation of warning sound on the basis of the setting information (109). Finally, the host device transmits an end command to the portable external storage device (110), and ends the program.

FIG. 9 is a view for explaining a sequence when the remaining battery amount display "user designation" mode in which information about the remaining amount of battery is transmitted to the host device upon reception of a user designation.

Note that processing up to display of a setting menu on the host device, establishment of wireless communication between the host device and the portable external storage device, and saving of setting information in the portable external storage device is the same as that shown in FIG. 8, and a description thereof will be omitted.

When the user wants to know the remaining amount of battery, he/she requests the host device to display the remaining amount of battery by, e.g., clicking an icon (301). Upon reception of the user request, the host device transmits a remaining battery amount acquisition request to the portable external storage device (302).

The portable external storage device checks the remaining amount of battery, and determines whether the checked remaining amount of battery is equal to or smaller than a remaining amount of battery represented by the setting information at which a warning is generated (303).

If the checked remaining amount of battery is larger than the remaining amount of battery represented by the setting information at which a warning is generated, i.e., the battery has a sufficient remaining amount, the portable external storage device transmits remaining battery amount information (304).

If the checked remaining amount of battery is equal to or smaller than the remaining amount of battery represented by the setting information at which a warning is generated, i.e., the battery is running short, the portable external storage device transmits battery warning information to the host device (305).

Upon reception of the remaining battery amount information or warning information, the host device performs processing such as display of a warning on the display or generation of warning sound on the basis of the setting information (306). Finally, the host device transmits an end command to the portable external storage device (307), and ends the program.

FIG. 10 is a view for explaining a sequence when the remaining battery amount display "warning" mode in which information about the battery is transmitted to the host device when the battery is running short.

Note that processing up to display of a setting menu on the host device, establishment of wireless communication between the host device and the portable external storage device, and saving of setting information in the portable external storage device is the same as that shown in FIG. 8, and a description thereof will be omitted.

The portable external storage device checks the remaining amount of battery (401). If the remaining amount of battery is equal to or smaller than a remaining amount of battery contained in setting information at which a warning is generated, the portable external storage device transmits battery warning information to the host device (402). The host device generates a warning on the basis of the battery warning information from the portable external storage device (403), and transmits an end command to the portable external storage device (404).

If the remaining amount of battery is larger than the remaining amount of battery at which a warning is generated, the portable external storage device does not transmit any information to the host device, and continuously checks the remaining amount of battery.

Note that the portable external storage device and the information processing apparatus serving as a host device wirelessly communicate with each other in the above-described embodiment, but may communicate by wire.

The present invention is not limited to the above-described embodiment, and can be variously modified without departing from the spirit and scope of the invention in practical use.

The portable external storage device according to the embodiment of the present invention can notify the user of information about the battery via the host device. The user can quickly know information about the battery regardless of the storage location of the portable external storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device comprising:
    a battery which supplies power to a communication section which communicates with an information processing apparatus;
    means for receiving, from the information processing apparatus, a setting information representing at least one of a notifying method for information about remaining energy of said battery, or level of remaining energy of said battery at which a warning is to be displayed on the information processing apparatus; and
    means for storing the received setting information; and
    means for detecting a remaining energy of said battery; and
    means for transmitting, to the information processing apparatus, information about the remaining energy of said battery on the basis of the received setting information.

2. A device according to claim 1, wherein said notifying means comprises
    means for determining whether the remaining energy of said battery detected by said detection means is not more than the remaining energy of said battery represented by the setting information when the notifying method represented by the setting information is a method of notifying the information processing apparatus of a remaining energy of said battery, and
    means for, when said determination means determines that the remaining energy of said battery is not more than the remaining energy of said battery represented by the setting information, notifying the information processing apparatus of warning information representing that the remaining energy of said battery is not more than the remaining energy of said battery represented by the setting information, and when said determination means determines that the remaining energy of said battery is more than the remaining energy of said battery represented by the setting information, notifying the information processing apparatus of the remaining energy of said battery detected by said detection means.

3. A device according to claim 1, wherein said notifying means comprises
    first means for determining whether a user has inputted a remaining battery energy information request, while the notifying method represented by the setting information is a method of notifying the information processing apparatus of a remaining energy of said battery in response to a user designation,
    second means for determining whether the remaining energy of said battery detected by said detection means is not more than the remaining energy of said battery represented by the setting information when said first means determines that the user inputs the remaining battery energy information request, and
    means for, when said second determination means determines that the remaining energy of said battery is not more than the remaining energy of said battery represented by the setting information, notifying the information processing apparatus of warning information representing that the remaining energy of said battery is not more than the remaining energy of said battery represented by the setting information and when said second means determines that the remaining energy of said battery is more than the remaining energy of said battery represented by the setting information, notifying the information processing apparatus of the remaining energy of said battery detected by said detection means.

4. A device according to claim 1, wherein said notifying means comprises
    means for determining whether the remaining energy of said battery detected by said detection means is not more than the remaining energy of said battery represented by the setting information when the notifying method represented by the setting information is a notifying method for a case in which the remaining energy of said battery is not more than a remaining energy of said battery represented by the setting information at which a warning is generated, and
    means for notifying the information processing apparatus of warning information representing that the remaining energy of said battery is not more than the remaining energy of said battery represented by the setting information, when said determination means determines that the remaining energy of said battery is not more than the remaining energy of said battery represented by the setting information.

5. A device according to claim 1, in which the setting information includes avoidance destination information representing an avoidance destination of data in the device when a warning is generated, and which further comprises means for determining whether the remaining energy of said battery detected by said detection means is not more than the remaining energy of said battery represented by the setting information at which a warning is generated, and means for storing data stored in the external storage device in an alternate storage location specified by the avoidance destination information when said determination means determines that the remaining energy of said battery detected by said detection means is not more than the remaining energy of said battery represented by the setting information at which a warning is generated.

6. A device according to claim 1, wherein the information processing apparatus and the device wirelessly communicate with each other.

7. A remaining battery energy notifying method for a device in an information processing apparatus which communicates data with the device, comprising:

transmitting a setting information representing a notifying method for information about a remaining energy of a battery and a level of remaining energy of said battery at which a warning is generated to notify the information processing apparatus to the device, wherein the setting information is transmitted from the information processing apparatus;

receiving, from the device, information about the remaining energy of the battery acquired in the device in response to the setting information ; and displaying the received information about the remaining energy of the battery in the information processing apparatus.

8. A battery information notifying system which notifies an information processing apparatus serving as a host device of information about a battery of an external device, wherein the information processing apparatus comprises:

transmission means for transmitting, to the external device, setting information representing a notifying method for information about a remaining energy of a battery of the external device, and a remaining energy of the battery at which a warning is generated, the external device comprises:

a battery which supplies power to a communication section which communicates with a plurality of information processing apparatuses;

means for detecting a remaining energy of said battery;

means for storing setting information transmitted from the information processing apparatus; and means for notifying the host device of information about the remaining energy of said battery detected by said detection means, on the basis of the setting information stored in said storage means, and the information processing apparatus further comprises:

means for receiving the information about the remaining energy of said battery from the external device; and means for exhibiting the received information about the remaining energy of said battery on the basis of the notifying method for the information about the remaining energy of said battery represented by the setting information.

9. An external storage device comprising:

a battery which supplies power to a communication section which communicates with an information processing apparatus;

means for detecting a remaining energy of said battery;

means for storing setting information representing a notifying method for information about a remaining energy of said battery transmitted from the information process apparatus, and a remaining energy of said battery at which a warning is generated; and means for notifying the information processing apparatus of information about the remaining energy of said battery detected by said detection means on the basis of the setting information stored in said storage means.

* * * * *

UNITED STATES PATENT AND TRADEMARK OFFICE
CERTIFICATE OF CORRECTION

PATENT NO. : 6,831,444 B2
DATED : December 14, 2004
INVENTOR(S) : Kobayashi et al.

It is certified that error appears in the above-identified patent and that said Letters Patent is hereby corrected as shown below:

Column 9,
Lines 55-56, change "processing, apparatus," to -- processing apparatus, --.

Column 10,
Line 46, change "information and" to -- information, and --.

Column 11,
Line 39, change "information ; and" to -- information; and --.

Column 12,
Line 37, change "process" to -- processing --.

Signed and Sealed this

Nineteenth Day of April, 2005

JON W. DUDAS
*Director of the United States Patent and Trademark Office*